May 15, 1934.  R. H. MOULTON  1,958,489
SHOCK ABSORBER
Filed March 22, 1930   3 Sheets-Sheet 1
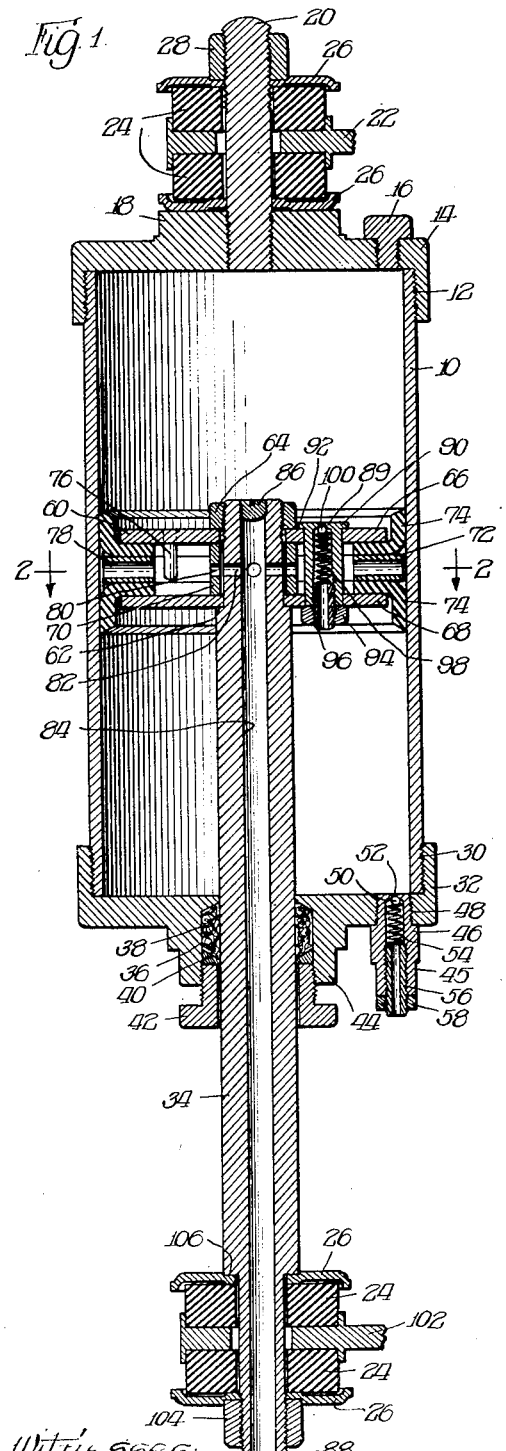
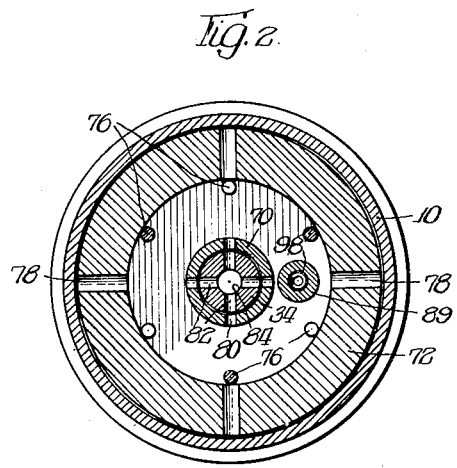
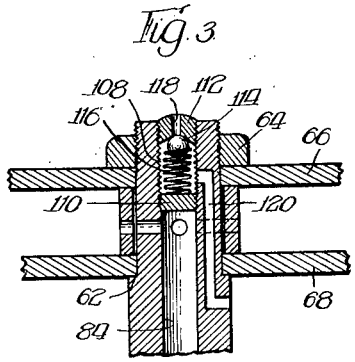
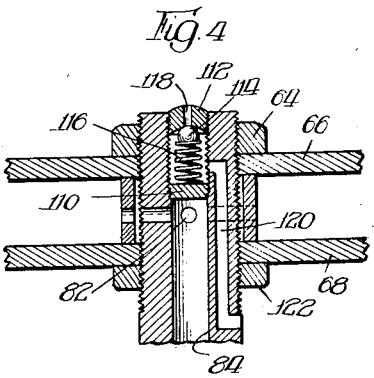
Inventor:
Rollin H Moulton May 15, 1934.  R. H. MOULTON  1,958,489
SHOCK ABSORBER
Filed March 22, 1930   3 Sheets-Sheet 2
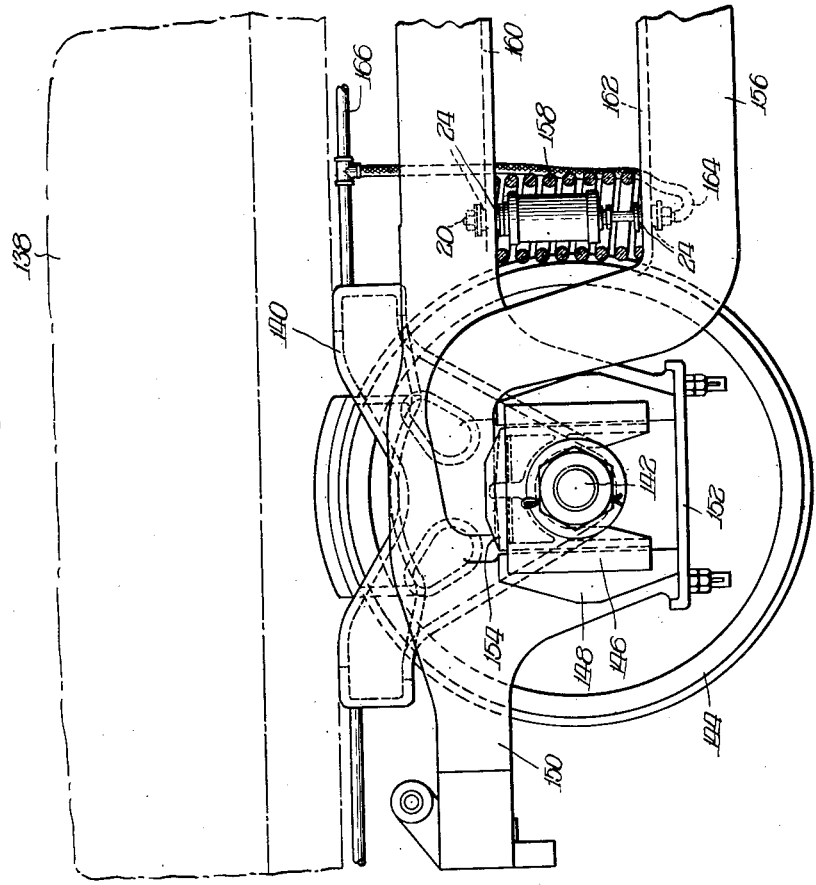
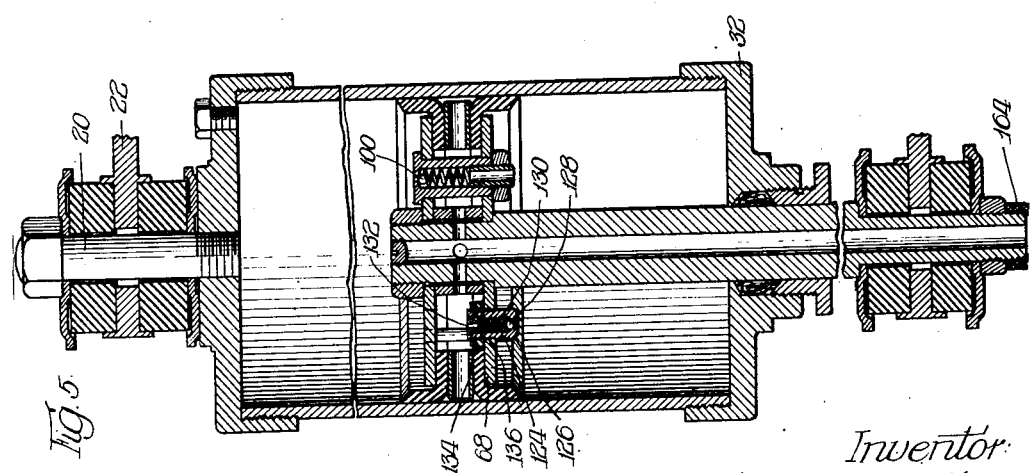

May 15, 1934.   R. H. MOULTON   1,958,489
SHOCK ABSORBER
Filed March 22, 1930   3 Sheets-Sheet 3
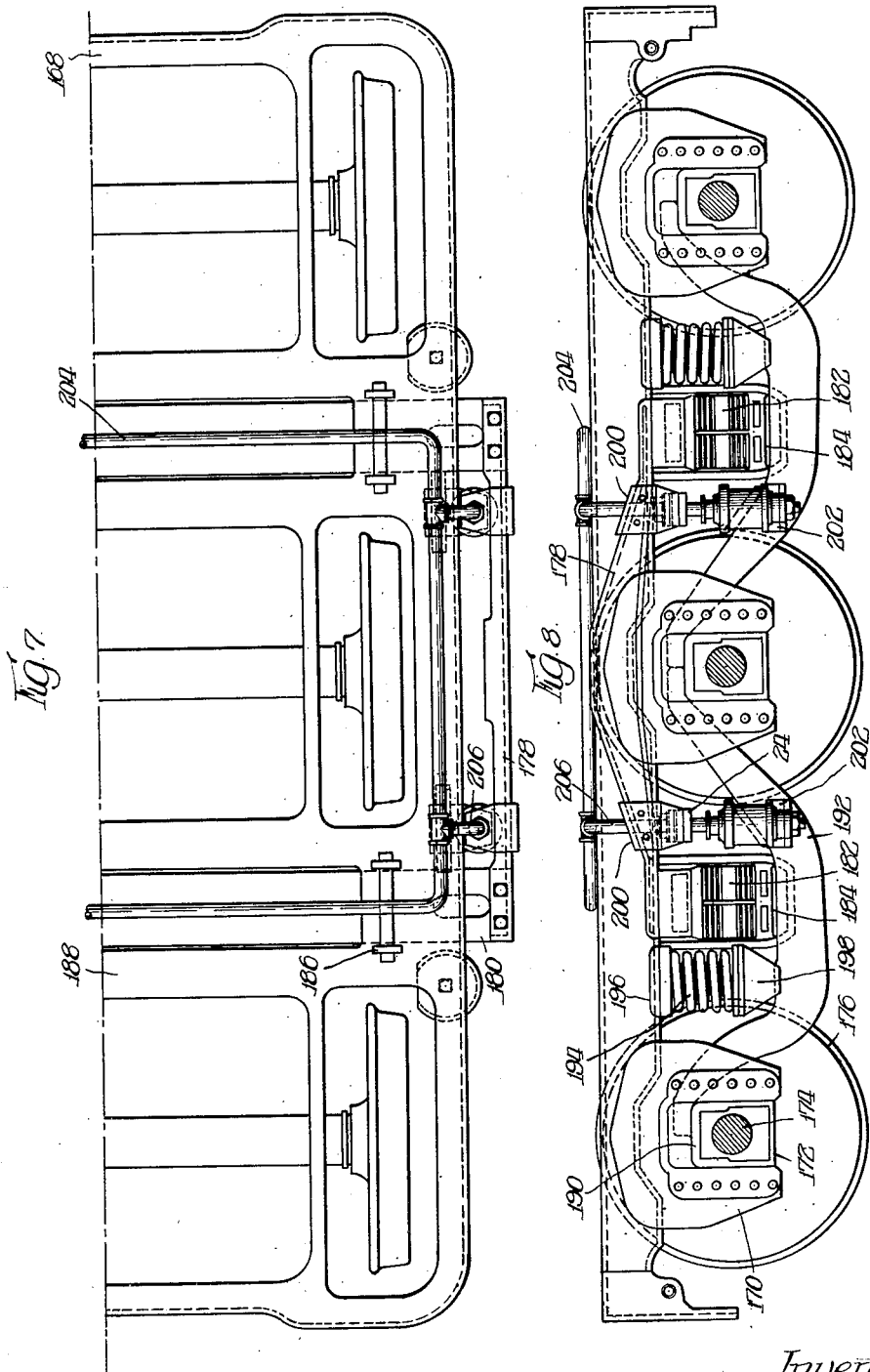

Patented May 15, 1934

1,958,489

UNITED STATES PATENT OFFICE 1,958,489

SHOCK ABSORBER

Rollin H. Moulton, Berwyn, Ill.

Application March 22, 1930, Serial No. 437,992

24 Claims. (Cl. 188—88)

This invention pertains to shock absorbers or cushioning devices, and more particularly to that class of device adapted to be used on road vehicles, airplanes, track vehicles, or in fact, between any parts having relative movement therebetween where it is desired to retard or cushion the movements between said parts.

In shock absorbers now in use, there are a great many of the so-called hydraulic type. Some of the finer of this type are double acting, but at the expense of added weight and finer fitted parts, to prevent leakage and insure practical operation. This type of shock absorber is necessarily quite expensive, and in fact, the expense is such as to be almost prohibitive for cars of the cheaper type. There are other well-known types of hydraulic shock absorbers which do not involve the snubbing action, or employ only the snubbing action. In other words, they are not double acting, and even with such devices, the cost is not within the price range of mechanical snubbers, though it is admitted the hydraulic shock absorbers are decidedly advantageous and desirable. Further, even the most expensive shock absorbers do not provide means for increasing the snubbing action, which is desirable, especially in heavy duty work. That is, the movement in either direction is balanced, which is often-times not desirable and does not meet particular needs.

In busses and the like heavy duty carriers where air brakes have been effectively used, and to properly supply compressed air to the air brakes, a compressor is run off the power plant. In such vehicles, in order to get the proper shock absorbing, the units disposed between the body and the axles or wheels must heretofore have been over-size in order to properly take care of the immense weights, and so it would be very advantageous to provide a shock absorber wherein the initial pressure is very high, and a simple way of handling this situation would be to have the shock absorber associated with the compressor.

In railway rolling stock the problem of checking side sway is a very important one, both from a standpoint of comfort to the passengers in a passenger train, and from a standpoint of power necessary to move a freight train. From a standpoint of economy in freight service, a single locomotive is used where possible to haul a great number of cars, especially where the track is laid in flat country, but side sway of the cars causes the wheel flanges to contact the side of the rail, and the friction so developed is enormous. Shock absorbing devices now in use would not be sufficient to cut down the side sway of the cars or cushion the vertical movement for the reason that the weights to be handled are too great. However, by providing a shock absorbing device wherein the initial pressure is much higher than atmospheric, this can be accomplished.

It is therefore an object of the invention to provide a cushioning device utilizing a fluid as an absorber medium.

Another object is to provide a device for effectively cushioning shocks between parts from a plurality of directions.

Yet another object is to provide a double acting checking or cushioning device using a plurality of checks in each direction of operation, and one which combines the action of a shock absorber and a snubber.

A further object is to provide a cushioning device wherein it is possible to vary the resistance to operation in either direction.

A still further object is to provide a cushioning device readily adaptable to all uses, as on road vehicle, railroad draft gear, between parts of track vehicles having relative movement, airplanes, engine or other prime or secondary movers and their beds, in fact, between any parts having relative movement, to cushion or check said parts in operation thereof.

Yet further objects are to provide a fluid cushioning device of lighter and sturdier structure than those used, one in which little wear takes place, one that is easy to manufacture and requires little or no attention once installed, one which more adequately meets service conditions, and one which is inexpensive to make and maintain and fulfills all requirements of service and manufacture.

An additional object is to provide a cushioning device wherein the initial pressure is materially higher than atmospheric.

Another additional object is to provide a cushioning device for use in heavy vehicles wherein the initial pressure of the device is controlled by the pressure of the compressor or air line carried by the vehicle and wherein the exhaust air used in the device is returned to the air line and not exhausted to the atmosphere.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a sectional elevation of one form of cushioning device embodying the invention;

Figure 2 is a sectional plan through the piston, cylinder and associated parts of the device illustrated in Figure 1, the same being taken substantially in the plane as indicated by line 2—2 of Figure 1;

Figure 3 is an enlarged sectional elevation through the piston rod and piston showing a modified form of by-pass;

Figure 4 is an enlarged sectional elevation through the piston rod and piston showing another modified form of by-pass;

Figure 5 is a fragmentary sectional elevation through a modified form of cushioning device embodying the invention;

Figure 6 is a fragmentary elevation through a track vehicle truck showing an application of the device shown in Figure 5 to the truck and its association with the train line;

Figure 7 is a fragmentary top plan view of a modified form of track vehicle truck showing the application of the device shown in Figure 5 thereto; and Figure 8 is a side elevation of the truck shown in Figure 7 showing the application of the shock absorbers thereto.

Referring first of all to the modification shown in Figures 1 and 2, the device consists essentially of a cylinder 10 threaded at 12 for the reception of a cap 14, said cap being provided with lubricating means in the form of a removable screw 16, the cap also being provided with a threaded boss 18 adapted to receive the upstanding threaded screw member 20 forming securing means with the bracket 22, only a portion of which is shown. The bracket is formed with an aperture quite a bit larger than the diameter of the screw 20 so that a substantial movement can occur between the screw and the bracket, said bracket being preferably dished for the reception of rubber cushioning members 24 disposed in the dished portion and retained in cap members or washers 26, the whole being maintained in assembled position by means of the nut 28. It will thus be seen that a rubberized, substantially universal joint is provided between the bracket 22 and the cylinder, it being understood that the bracket 22 may be secured to a part of a vehicle or to any relatively moving part.

The lower portion of the cylinder as viewed in Figure 1 is threaded as at 30 for the reception of an end closure member 32 for the reception of corresponding threads formed on the end closure member 32, said member being apertured for the reception of a piston rod 34 extending through a stuffing box 36 provided in the closure 32. The stuffing box may conveniently take the form of metallic or other packing 38 retained by the washer 40, all held in place by means of the screw threaded gland 42 secured in the box 44 formed on the closure, the gland forming means for tightening the packing around the piston rod. The closure member is also provided with an outwardly opening valve 45 which may conveniently take the form of a casing 46 threaded as at 48 into the closure, the valve being provided with a normally seated ball 50 closing the aperture 52, the ball being urged toward seating position by means of the coil spring 54, said spring being adjustably mounted in the housing by means of the hollow screw 56 locked in adjusted position by means of the locking nut 58. It will thus be seen that by moving the screw member 56 inwardly or outwardly the pressure of the spring is controlled whereby the valve may be made harder or easier to unseat.

A piston 60 is provided in the cylinder and is secured on the piston rod 34 between the shoulder 62 formed on the piston rod, and the retaining nut 64 is threaded on the end of the piston rod. As shown, the piston may consist of an upper retaining plate 66 adapted to be spaced from a lower retaining plate 68 by means of a thimble or sleeve 70, it being seen that when the retaining nut 64 is screwed down tightly, an air or fluid tight joint is made between the plates and the piston rod. Between the outer ends of the plates there is provided a spacing ring 72, between which and the upper and lower plates there are provided leathers 74, said leathers being provided with upwardly and downwardly extending annular flanges respectively engaging the sides of the cylinder; i. e., the flanges may be said to toe toward the adjacent end of the cylinder. The flanges form valves whereby the pressure in any one side of the cylinder is prevented from passing said valves or seals and entering the hollow piston head so formed, though fluid may pass from the hollow piston head past the leathers into either side of the cylinder. The spacing rings are positioned by means of pins 76, say three in number, and provided on the respective plates 66 or 68. The spacing ring 72 is suitably apertured as at 78, and the thimble 70 and the piston rod 34 are suitably apertured as at 80 and 82, respectively, whereby communication is established between the hollow piston head and the channel 84 provided in the piston rod 34, the upper end of the channel 84 being closed by means of the nut 86, the lower end of the piston rod being threaded as at 88 and being open.

By the arrangement of the thimble 70 and the piston rod 34 it will be appreciated that an adjustment may be made whereby the air may be controllably metered through the piston rod into the hollow piston head, as the sleeve may be rotated to fully align or only to partially align the apertures 80 and 82. Thus the air passing through the piston rod and into the piston head can be controlled by setting the sleeve at the factory for operation with vehicles of known capacity.

A valve member 89 is disposed through the piston head, said valve member consisting essentially of a casing 90 having stop shoulders 92 provided at one end and being secured at the other end by means of the lock nut 94 threaded on the adjusting screw 96, said screw being threaded into the housing 90 for selectively varying the pressure of the spring 98 controlling operation of the ball valve 100, said valve serving to control the passage of air through the housing 90 from one end of the cylinder to the other. The lower end of the piston rod is provided with a pair of washers 26 between which rubber blocks 24 are provided, said blocks being disposed between the washers and a bracket 102 adapted to be secured to a relatively movable part of the vehicle or machine, the washers 26 being retained in position between a nut 104 and a shoulder 106 formed on the piston rod.

Referring now more particularly to Figures 3 and 4, the valve forming communication between the ends of the cylinder may be placed in the piston rod, in which case the piston rod is internally threaded as at 108 and is provided with a plug 110 threaded therein and forming an end closure for the channel 84. The outer end of the piston rod is provided with the adjusting valve member 112 forming a valve seat for the ball valve 114, said valve being normally held in closed position by means of the spring 116 whereby fluid passage through channel 118 is normally prevented. The piston rod is formed with the channel 120 forming communication with the valve formed between the members 110 and 112, and with the portion of the cylinder under the lower cover plate 68 of the piston.

In the form shown in Figure 4, the upper and outer threads of the piston rod provided for the nut 64 are continued to a point below the lower cover plate 68, and instead of the shoulder 62 there is provided another securing nut 122. In this case the channel 120 extends below the threaded portions.

The structure shown in Figure 5 is substantially the same as that shown in Figure 1, the only substantial difference being that the valve member 45 is omitted. That is, there is no valve member formed in the lower cover member 32. In this case the lower piston plate 68 is provided with a valve member 124 providing communication between the lower portion of the cylinder, as viewed in Figure 5, and the hollow piston head. The valve may consist of an apertured casing 126 provided with a ball valve 128, said valve being maintained in normal seated position by means of the spring 130, said spring being adjustably maintained in operative position by means of the hollow threaded screw 132, the lock nut 134 being provided for retaining the valve and screw 132 in operative position. As shown, the valve is threaded as at 136 into the lower plate 68.

Referring to the mounting of the shock absorber shown in Figure 5 on the truck structure shown in Figure 6, it will be seen that the body of the vehicle 138 is mounted on the bolster 140, said bolster having a depending portion cooperating with the axle 142 on which the wheel 144 is mounted. The axle is provided with pedestal blocks 146 having vertical sliding movement in the pedestal jaws 148 provided on the main truck frame 150, the lower portion of the jaws being closed by means of the retaining plate 152. The upper portion of each pedestal block is provided with an equalizer seat 154 for receiving an end of the equalizer 156 extending between adjacent axles, suitable coil springs 158 being mounted between the spring seats (not shown) provided on the main frame and equalizer. In a case where large springs 158 are used, the shock absorber may be mounted in each of the coil springs 158, in which case the screw threaded member 20 passes through a flange 160 of the main frame, the flange 160 taking the place, then, of the brackets 22. The rubber blocks 24 are disposed on each side of the flange. The lower end of the piston rod is secured to a flange, web or bracket 162 provided on the equalizer 156, the rubber blocks 24 being provided on each side of said web as has already been described with respect to the bracket 102. The lower end of the piston rod is also secured to a flexible tube 164 which extends up and joins the train line 166. It will thus be seen that there is a closed system established between the shock absorber and the train line. That is, none of the air is exhausted to the atmosphere from the shock absorber. Therefore it is evident that an obvious advantage occurs from this arrangement as the initial pressure set up in the device is 70 lbs., that is, the pressure of the train line, and it will be appreciated that as the pressures increase rapidly upon movement of the piston head, the cushioning due to the air pressure is considerable, even for small diameters of the cylinder of the cushioning device.

In the truck shown in Figure 7, which is of the six-wheel type, there is provided a main frame 168 having pedestal bosses 170 adapted to have cooperative relation with the slide blocks or pedestals 172 cooperating with the axles 174 on which the wheels 176 are mounted. The vehicle body is mounted on a main bearing (not shown) and side bearings on the body engage bearings on the yokes 178, said yokes being secured on either side of the car by transverse bolsters 180 on which bolsters the main bearing is mounted, said bolsters being mounted on leaf springs 182 supported on a swing plank 184 suspended upon links 186 carried by the transoms 188. The pedestal blocks are provided with equalizer seats 190 whereby equalizers 192 may be disposed between adjacent axles, coil springs 194 being disposed between suitable seats 196 and 198 carried by the main frame and equalizers. Brackets 200 are provided on the yoke 178 and are adapted to correspond to the bracket 102 described with respect to Figures 1 and 5, rubber blocks 124 being mounted as described to provide a cushioning, substantially universal joint. The equalizers are provided with brackets 202 corresponding to the bracket 102, and are adapted for providing securing means between the cylinder and equalizers. The main truck frame may be conveniently provided with a conduit in the form of tubing 204 in communication with the train line, and each of the shock absorbing units is secured to the tubing 204 through flexible tubing 206 whereby a closed system is formed between the shock absorbing unit and the train line.

Referring first of all to the operation of the device shown in Figure 1, let it be assumed that the piston is moved upwardly with respect to the cylinder. The air above the piston will be compressed until such time as it overcomes the tension in the spring 98, at which time the valve 100 will open, and the compressed air, instead of being exhausted to the atmosphere, will pass into the lower portion of the cylinder below the piston, whereby the air pressure in the lower portion of the cylinder will be increased. Upon initial movement of the piston upwardly, and before the air pressure above the piston has operated the valve member 100, the pressure of the air below the piston will be decreased, tending to form a vacuum. However, the vacuum is broken by air being drawn through the piston rod and passing through apertures 82, 80 and 78 past the lower leather into the lower portion of the cylinder. When, however, such pressure has been built up in the upper portion of the cylinder as to open the valve member 100, the air passing into the lower portion of the cylinder will serve to set the leathers to prevent escape of the air. At this time no additional air is drawn through the hollow piston rod and then supplied to the under side of the piston, as the compressed air forced into the lower part of the cylinder serves to seal the lower leather. Continued upward movement of the piston continues to supply air under pressure to the under side of the piston thus building the pressure up to a point above atmospheric pressure (and this can be made of any practical value), assuming that the air drawn in through the hollow piston rod is taken from the atmosphere. The piston 14 in downward movement will have no free rebound as this downward movement is immediately resisted by the compressed air trapped in the lower portion of the piston which cannot return past the valve 89 since it is a one way valve. The piston, however, in going down or returning, forces the compressed air out through the bleed valve 50 after a predetermined movement. Therefore it will be readily understood that in this form the compressed air is supplied only to the lower portion of the cylinder. The operation of the device is, of course, the same whether the valve shown in Figure 2 or the valves shown in Figures 3 or 4 be used, as each is a one way valve, the passage of air in the latter cases being through the channel 120 formed in the piston rather than directly through the valve housing from one side of the cylinder to the other.

In operation of the device shown in Figure 5, let it be assumed that the lower end of the piston rod is secured to the train line through the flexible connection 164; thus the initial pressure in the cylinder will be 70 lbs. instead of atmospheric. If the device shown in Figure 1 were used, instead of the device per se forming a closed system, a connection in the form of a flexible hose would have to be made between the valve 45 and the train line or the hollow piston rod, so, in order to cut out this extra connection, the valve 124 is used instead of the valve housing 46. The operation of the valve 100 on upward movement is the same as has already been described with respect to Figure 1. In the return movement, however, after the air is compressed in the lower portion of the cylinder, it finally overcomes the pressure of the spring 130 opening the valve 128 whereby the excess compressed air is bled into the hollow piston, and either back into the train line or past the leathers to a point above the piston so that thus there is no waste of air to cause any excessive drain on the compressor.

As side sway of the vehicle is communicated to the equalizers as well as the vertical movement, it will be seen that the devices applied as described will materially cut down this objectionable side sway, as well as the relative vertical movement between the car body and the wheels.

It will thus be seen that the construction and operation of the device relates this application to my application Serial No. 290,624, filed July 5, 1928, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a cushioning device, the combination of a cylinder, a piston mounted therein having a piston rod, and means connected to said device for increasing the initial pressure therein substantially above atmospheric, said piston and rod having means therein for supplying air from said first named means to either side of said piston upon movement thereof.

2. In a cushioning device, the combination of a cylinder, a piston mounted therein and having a piston rod, means connected to said device for increasing the initial pressure therein substantially above atmospheric, said piston and rod having means therein for supplying air from said first named means to either side of said piston upon movement thereof, and means for unequally affecting movement of said piston.

3. In a cushioning device, the combination of a cylinder, a piston mounted for sliding movement therein, a piston rod associated with said piston, means in said piston for permitting flow of fluid into said cylinder from outside said cylinder upon movement of said piston, and means extending through said piston for conducting fluid from one end of said cylinder to the other whereby fluid is conducted from one side of said piston to the other.

4. In a cushioning device, the combination of a cylinder, a piston mounted for sliding movement therein, a piston rod associated with said piston, means in said piston for permitting flow of fluid into said cylinder from outside said cylinder upon movement of said piston, and means in said piston rod for conducting fluid from one end of said cylinder to the other whereby fluid is conducted from one side of said piston to the other.

5. In a cushioning device, the combination of a cylinder, a piston mounted for sliding movement therein, a piston rod associated with said piston, means in said piston for permitting flow of fluid into said cylinder from outside of said cylinder upon movement of said piston, means for conducting fluid from one end of said cylinder to the other whereby fluid is conducted from one side of said piston to the other, and means for exhausting fluid from one end of said cylinder to said piston.

6. In a cushioning device, the combination of a cylinder, a piston mounted therein having a piston rod, and means connected to said device for increasing the initial pressure therein substantially above atmospheric, said piston rod having means therein for permitting the supplying of air from one side of said piston to the other.

7. In a cushioning device, the combination of a cylinder, a piston mounted therein and having a piston rod, means connected to said device for increasing the initial pressure therein substantially above atmospheric, said piston and rod having means therein for supplying air from said first named means to either side of said piston upon movement thereof, and means for supplying air from one side of said piston to the other.

8. In a cushioning device, the combination of a cylinder, a piston mounted for sliding movement therein, a piston rod associated with said piston, means in said piston for permitting flow of fluid into said cylinder from outside said cylinder upon movement of said piston, means extending through said piston for conducting fluid from one end of said cylinder to the other whereby fluid is conducted from one side of said piston to the other, and means for conducting fluid from one side of said piston to said piston.

9. In a cushioning device, the combination of a cylinder, a piston mounted for sliding movement therein, a piston rod associated with said piston, means in said piston for permitting flow of fluid into said cylinder from outside said cylinder upon movement of said piston, means extending through said piston for conducting fluid from one end of said cylinder to the other whereby fluid is conducted from one side of said piston to the other, and means in said piston for conducting fluid from one side of said piston to said piston.

10. In a cushioning device, the combination of a cylinder, a piston mounted for sliding movement therein, a piston rod associated with said piston, means in said piston for permitting flow of fluid into said cylinder from outside said cylinder upon movement of said piston, and means for conducting fluid from one side of said piston to said piston.

11. In a cushioning device, the combination of a cylinder, a piston mounted for sliding movement therein, a piston rod associated with said piston, means in said piston for permitting flow of fluid into said cylinder from outside said cylinder upon movement of said piston, and means in said piston for conducting fluid from one side of said piston to said piston.

12. In a cushioning device, the combination of a cylinder, a piston mounted for sliding movement therein, a piston rod associated with said piston, means in said piston for permitting flow of fluid into said cylinder from outside of said cylinder upon movement of said piston, means for conducting fluid from one end of said cylinder to the other whereby fluid is conducted from one side of said piston to the other, and means in said piston for exhausting fluid from one end of said cylinder to said piston.

13. In a vehicle having a pressure line, wheels, resilient members disposed between the vehicle body and wheels, pneumatic cushioning devices disposed between said wheels and body and connected to and supplied from said pressure line, whereby the initial pressure in said cushioning device is substantially equal to the pressure in said line, and exhaust means in said cushioning devices for returning the exhaust air to said pressure line.

14. In a cushioning device, the combination of a cylinder, a piston slidably mounted therein, a piston rod secured to said piston and extending through one end of said cylinder, said piston rod and piston having means therein for supplying fluid to the end of the cylinder from which said piston is traveling, means in said piston for conducting fluid from the end of said cylinder toward which said piston is traveling, said means being operative after a predetermined movement of said piston, and means for conducting fluid to said piston from one side of said piston after a predetermined movement of said piston.

15. In a cushioning device, the combination of a cylinder, a piston slidably mounted therein, a piston rod secured to said piston and extending through one end of said cylinder, said piston rod and piston having means therein for supplying fluid to the end of the cylinder from which said piston is traveling, means in said piston for conducting fluid from the end of said cylinder toward which said piston is traveling to the end of the cylinder from which said piston is traveling, said means being operative after a predetermined movement of said piston, and means for conducting fluid to said piston from one side of said piston after a predetermined movement of said piston.

16. In a cushioning device, the combination of a cylinder, a piston slidably mounted therein, a piston rod secured to said piston and extending through one end of said cylinder, said piston rod and piston having means therein for supplying fluid to the end of the cylinder from which said piston is traveling, means in said piston for conducting fluid from the end of said cylinder toward which said piston is traveling to the end of the cylinder from which said piston is traveling, said means being operative after a predetermined movement of said piston, and means for conducting fluid to said piston from the opposite side of the piston from that of said second named means after a predetermined movement of the piston in a reverse direction from the first named movement.

17. In combination, a piston comprising spaced members, a piston rod cooperating with said members, said piston rod having a channel and apertures therein communicating with said channel and said piston between said spaced members, and a spacing member disposed between said spaced members and having an aperture adapted to register with one of said apertures in said piston rod whereby the communication between said channel and said piston may be controlled.

18. In combination, a piston comprising spaced members, a piston rod cooperating with said members, said piston rod having a channel and apertures therein communicating with said channel and said piston between said spaced members, said piston rod having a channel therein communicating with each side of said piston, and a valve in said last named channel for controlling flow therethrough.

19. In a vehicle, the combination of a body and wheels mounted for relative movement with respect thereto, a shock absorber mounted between said body and wheels to modify relative movements therebetween, said shock absorber comprising a cylinder, said cylinder having a normally closed end member, the opposite end of said cylinder having a member having a stuffing box therethrough but otherwise normally closed, a piston in said cylinder, a piston rod secured to said piston and extending through said stuffing box, said rod having a channel therein in communication with a hollow portion in said piston, a normally closed valve connecting one side of said piston to the other, a normally closed valve connecting one side of said piston to said hollow portion of said piston, said piston having means permitting communication between said hollow portion thereof and one side of said cylinder, and means connected to said piston rod for maintaining the pressure in said cylinder normally different than atmospheric.

20. In a car truck, the combination of a load carrying member, a side frame associated therewith, means supporting said load carrying member on said side frame, a pressure line, a cushioning device interposed between said side frame and load carrying member for dampening the movement of said load carrying member, said device including a cylinder, a piston mounted for sliding movement therein, a piston rod associated with said piston and connected to said pressure line, means in said piston for permitting flow of fluid into said cylinder from outside of said cylinder upon movement of said piston, means extending through said piston for conducting fluid from one end of said cylinder to the other whereby fluid is conducted from one side of said piston to the other, and means for conducting fluid from one side of said piston to said piston.

21. In a car truck, the combination of a load carrying member, a side frame associated therewith, means supporting said load carrying member on said side frame, a pressure line, a cushioning device interposed between said side frame and load carrying member for dampening the movement of said load carrying member, said device including a cylinder, a piston mounted for sliding movement therein, a piston rod associated with said piston and connected to said pressure line, means in said piston for permitting flow of fluid into said cylinder from said pressure line upon movement of said piston, means extending through said piston for conducting fluid from one end of said cylinder to the other whereby fluid is conducted from one side of said piston to the other, and means for conducting fluid from one side of said piston to said piston.

22. In a car truck, the combination of a load carrying member, a side frame associated therewith, means supporting said load carrying member on said side frame, a pressure line, a cushioning device interposed between said side frame and load carrying member for dampening the movement of said load carrying member, said device including a cylinder, a piston mounted for sliding movement therein, a piston rod associated with said piston and connected to said pressure line, means in said piston for permitting flow of fluid into said cylinder from said pressure line upon movement of said piston, and means extending through said piston for conducting fluid from one end of said cylinder to the other whereby fluid is conducted from one side of said piston to the other.

23. In a car truck, the combination of a load carrying member, a side frame associated therewith, means supporting said load carrying member on said side frame, a pressure line, a cushioning device interposed between said side frame and load carrying member for dampening the movement of said load carrying member, said cushioning device including a cylinder, a piston mounted for sliding movement therein, a piston rod associated with said piston and connected to said pressure line, means in said piston for permitting flow of fluid into said cylinder from outside of said cylinder upon movement of said piston, and means for conducting fluid from one side of said piston to said piston.

24. In a car truck, the combination of a load carrying member, a side frame associated therewith, means supporting said load carrying member on said side frame, a pressure line, a cushioning device interposed between said side frame and load carrying member for dampening the movement of said load carrying member, said cushioning device including a cylinder, a piston mounted for sliding movement therein, a piston rod associated with said piston and connected to said pressure line, means in said piston for permitting flow of fluid into said cylinder from said pressure line upon movement of said piston, and means for conducting fluid from one side of said piston to said piston.

ROLLIN H. MOULTON.